United States Patent [19]

McKinzie et al.

[11] 4,215,155

[45] Jul. 29, 1980

[54] METHOD OF PREPARING MODIFIED TITANIUM DIOXIDE PHOTOACTIVE ELECTRODES

[75] Inventors: Howard McKinzie, Framingham; Elizabeth A. Trickett, Acton, both of Mass.

[73] Assignee: GTE Laboratories Incorporated, Waltham, Mass.

[21] Appl. No.: 918,001

[22] Filed: Jun. 22, 1978

[51] Int. Cl.² ............... C25B 11/04; C25B 11/10
[52] U.S. Cl. .................... 427/74; 427/377; 429/111; 427/126.3; 427/376.4
[58] Field of Search ............ 429/111; 204/290 F; 427/74, 126, 376 C

[56] References Cited

U.S. PATENT DOCUMENTS

| | | | |
|---|---|---|---|
| 3,259,558 | 7/1966 | Hagiwara | 148/63 |
| 3,681,133 | 8/1972 | Dantro | 427/74 |
| 3,948,751 | 4/1976 | Bianchi | 204/290 F |
| 3,975,557 | 8/1976 | Kuchek | 204/290 F |
| 4,003,817 | 1/1977 | Bianchi | 204/290 F |
| 4,025,669 | 5/1977 | Greenstein | 427/123 |
| 4,040,918 | 8/1977 | Johnson | 204/290 F |
| 4,070,504 | 1/1978 | Bianchi | 204/290 F |
| 4,086,157 | 4/1978 | Koziol | 204/290 F |

OTHER PUBLICATIONS

Augustynski, *J. Electrochemical Soc.*, vol. 124, No. 7 (7-1977) *Novel . . . Water* pp. 1063-1064.
Kennedy, *J. Electrochem. Soc.* vol. 125 (5-1978) No. 5, *Photo-oxidation . . . Electrodes*, pp. 709-714.
Kennedy, *J. Electrochem. Soc.*, vol. 125, No. 5 (5-1978) *Flatband . . . Plot*, pp. 723-726.
Haneman, *J. Electrochemical Soc.*, vol. 124, No. 6 (6-1977) *Electrochemical . . . $Fe_2O_3$* pp. 861-862.

*Primary Examiner*—Michael F. Esposito
*Attorney, Agent, or Firm*—Jerry F. Janssen

[57] ABSTRACT

A method of preparing polycrystalline photoactive semiconductor electrodes utilizable in photoassisted oxidation reactions comprises the steps of (1) providing a suspension of finely divided mixture of titanium dioxide and at least one oxide of a metal selected from the group consisting of aluminum and the d-electron transition metals other than titanium, (2) applying the suspension to the surface of a metal body, (3) sintering the applied coating to the metal body.

5 Claims, No Drawings

METHOD OF PREPARING MODIFIED TITANIUM DIOXIDE PHOTOACTIVE ELECTRODES

CROSS-REFERENCE TO RELATED APPLICATIONS

This application contains subject matter related to subject matter disclosed and claimed in the following copending applications, all of which are filed concurrently herewith and assigned to the assignee of the present application.

Application Ser. No. 918,000 filed June 22, 1978 in the names of Howard McKinzie and Elizabeth A. Trickett entitled "An Improved $TiO_2$ Electrode for Photoelectrolysis".

Application Ser. No. 918,017 filed June 22, 1978 in the name of Elizabeth A. Trickett entitled "Method of Preparing Photoactive $TiO_2$-Coated Thin Film Electrodes".

Application Ser. No. 918,002 filed June 22, 1978 in the names of Howard McKinzie and Elizabeth A. Trickett entitled "In Situ Method of Preparing Modified Titanium Dioxide Photoactive Electrodes".

Application Ser. No. 918,018 filed June 22, 1978 in the names of Howard McKinzie and Elizabeth A. Trickett entitled "Modified Titanium Dioxide Photoactive Electrodes".

BACKGROUND OF THE INVENTION

This invention relates to photoactive semiconductor electrodes. More particularly, it is concerned with a method of preparing n-type semiconductor electrodes utilizable in electrochemical cells and in photoassisted electrochemical oxidation reactions.

There has been considerable recent interest in the application of photoactive semiconductor electrodes to the electrolysis of water and to the direct conversion of solar to electrical or chemical energy. The uses of such electrodes have recently been generalized to reduction-oxidation reactions in addition to the electrolysis of water. Oxidation reactions at n-type photoactive semiconductor electrodes and reduction reactions at p-type electrodes can be carried out at potentials much lower than ordinarily required using light as the driving force for the reactions. Such processes have been termed "photoassisted" rather than photocatalyzed reactions.

It is known that electrodes fabricated from single crystals of pure titanium dioxide, doped single crystals of titanium dioxide, or polycrystalline titanium dioxide deposited on an appropriate substrate can be used as photoelectrodes. Titanium dioxide normally has high electrical resistivity. To form electrically conductive semiconductor material the titanium dioxide is typically treated by reduction with hydrogen. It is theorized that such treatment produces a material with oxygen lattice deficiencies in the titanium dioxide crystal with the lattice defect sites contributing to the semiconductor properties. This partially reduced material can be characterized by the general formula $TiO_{(2<x)}$ where x takes on a value between zero and one. These partially reduced phases of titanium dioxide are called Magneli phases of titanium dioxide.

Because of the great possibilities which these electrodes have for the conversion of light to electrical or chemical energy, a number of studies have been directed to methods of fabricating electrodes which make such conversions more efficient. In previously described uses of n-type titanium dioxide semiconductor electrodes, it has generally been the practice to use electrodes formed of single crystals of $TiO_2$ or of polycrystalline $TiO_2$, reduced to the Magneli phases.

The technique of producing single crystal photoactive $TiO_2$ electrodes is described, for example, by S. N. Frank et al. in "Semiconductor Electrodes 11. Electrochemistry at n-Type $TiO_2$ Electrodes in Acentonitrile Solutions", *J. Am. Chem. Soc.*, 97:7427 (1975). Polycrystalline titanium dioxide electrodes produced by chemical vapor deposition techniques are treated by K. L. Hardee et al. in "The Chemical Vapor Deposition and Application of Polycrystalline n-Type Titanium Dioxide Electrodes to the Photosensitized Electrolysis of Water", *J. Electrochem. Soc.*, 122:739 (1975).

Single crystal $TiO_2$ electrodes or doped single crystal $TiO_2$ electrodes are often costly and difficult to produce. On the other hand, polycrystalline electrodes which utilize Magneli phase $TiO_2$ as the photoactive semiconductor material are less difficult and costly to produce, but are limited in their spectral response to wavelengths of light shorter than about 450 nanometers.

It is therefore an object of the present invention to provide a simple and improved method of fabricating modified polycrystalline photoactive semiconductor electrodes utilizable in photoelectrochemical cells and electrochemical oxidation reduction reactions which are photoactive at wavelengths longer than 450 nanometers. The method comprises the steps sequentially of applying a suspension of finely divided electrode coating material to the surface of a metal body wherein the electrode coating material comprises titanium dioxide and at least one oxide of a metal selected from the group consisting of aluminum and d-electron transition metals excluding titanium, and heating the coated metal body at an elevated temperature for a period of time sufficient to sinter the electrode coating to the metal body.

DETAILED DESCRIPTION

Photoactive semiconductor electrodes are fabricated according to the method of the present invention by providing a mixture of titanium dioxide and up to 50 mole percent of at least one oxide of a metal selected from the group consisting of aluminum and d-electron transition metals other than titanium in a volatile solvent. (As used throughout this specification and claims, the term "d-electron transition metal" means any metallic element of families 1b, 2b, 3b, 4b, 5b, 6b, 7b or 8 of the Periodic Table of the Elements as it appears on page B-3 of the 53rd Edition of the *Handbook of Chemistry and Physics*, Chemical Rubber Publishing Co., Cleveland, Ohio, 1972, including lanthanum and actinium, but excluding elements of the so-called "inner transition" lanthanide and actinide series).

The mixture of titanium dioxide and doping or modifying oxide can be made by simply coprecipitating the two materials from aqueous solution or suspension. Alternatively, the mixture can be made by simply shaking together the appropriate amounts of dry powders. The dry powdered mixture of oxides is taken up in sufficient volatile solvent to form a slurry of a consistency which is easily painted. The volatile solvent can be water, any low molecular weight ketone, alcohol, ester, or mixtures thereof. The proportions of volatile solvent and dry powdered oxide mixture are not critical, however a mixture of any easily spread consistency must be obtained. The resulting slurry or suspension is applied to the surface of a suitable electrically conductive metal body using the techniques of painting, flow coating, dipping, etc. Suitable metal substrates are titanium, stainless steel, Monel metal, platinum, or any metal which is not corroded by the electrolyte solution in which the electrode is to be used.

Following application of the electrode coating suspension to the metal body, the coated metal body is allowed to dry in air. The dried coated metal body is then heated in an oxygen-containing atmosphere at a temperature of from about 500° C. to about 800° C. for a period of from one-quarter hour to eight hours in order to sinter the electrode coating to the metal body. The oxygen-containing atmosphere may be pure oxygen or air. The heating time required for sintering varies directly with the partial pressure of oxygen in the heating atmosphere.

A surprising and unexpected property of electrodes fabricated by the method of this invention is their effective functioning even though in some cases there is apparently only a physical mixture of the titanium dioxide and modifying oxide. Incorporation of the oxide modifier into the titanium dioxide crystal lattice may be enhanced in the heating or sintering step. To the extent that such incorporation occurs, such incorporation may be substitutional or interstitial. If the metal ions of the oxide modifier so incorporated are in a chemical oxidation state other than +4, one or more of the surrounding titanium ions must assume an oxidation state other than its normal +4 state in the crystal lattice in order to preserve electrical charge neutrality. This adjustment of charge within the crystal results in lattice defect sites which provide the n-type semiconductor activity. In electrodes fabricated without an oxide modifier it is necessary to produce such lattice defects by reduction of the titanium dioxide with hydrogen or some other reducing gas. Such a reduction step is not required in the method according to the present invention although it may be used to further enhance the internal electrical conductivity of the electrodes so fabricated.

Dopant or modifier materials which have been found to be effective in producing photoactive p- and n-type semiconductor titanium dioxide electrodes possess some solid state solubility in titanium dioxide, and an impurity band lying within the energy band gap of titanium dioxide. Oxides of metals selected from the group consisting of aluminum and the d-electron transition metals other than titanium in which oxides the metal is in a chemical oxidation state other than +4 have been found to be effective.

DESCRIPTION OF THE PREFERRED EMBODIMENTS

In one embodiment, the mixture of titanium dioxide and doping or modifying oxide is formed by coprecipitating the mixture from aqueous solution. An aqueous solution of a compound of the metal selected as modifier is made and this aqueous solution is mixed with powdered finely divided titanium dioxide to form a suspension. The pH of this suspension is adjusted to cause the precipitation of the metal oxide together with the titanium dioxide powder from the suspension. This coprecipitated mixture of titanium dioxide and modifying oxide is washed free of any acid or base used to cause the precipitation, and is air dried to form the electrode coating material.

In an alternative embodiment of the invention, the mixture of titanium dioxide and modifying oxide can be made by simply shaking together finely divided powders of titanium dioxide and the oxide modifier.

The following Examples are provided to allow one skilled in the art to practice the present invention. Although these Examples are not to be viewed as limiting the scope of the invention but merely illustrative thereof.

EXAMPLES

In each of the following Examples, photoactive semiconductor titanium dioxide electrodes were produced by painting a coating of electrode material on a 1 cm × 1 cm piece of 5 mil (0.13 mm) thick metal foil. The foil pieces were cleaned and etched in each case by immersing for two minutes in a bath comprising 50 parts by weight water, one part hydrogen peroxide, and one part concentrated hydrofluoric acid. Following immersion in the etching bath, the foil pieces were rinsed free of acid and air dried.

The electrode coating materials were prepared by methods detailed in each of the following Examples. The dry electrode coating powders were slurried in sufficient aqueous acetone in each case to produce a mixture of a consistency which could be easily painted on the metal body with a brush. It was found that the amounts of solvent and coating material used in each Example to form the slurry were not critical as long as a slurry of easily spread consistency was obtained.

The coated foil pieces were then heated in air at a temperature between 500° C. and 800° C. for a period of up to eight hours. In all of the following Examples, except Example V, the coated electrodes were further subjected to heating in a hydrogen atmosphere at a temperature between 400° C. and 1000° C. for a period of up to three hours. It is theorized that this reduction step serves to improve the internal electrical conductivity of the electrode coating films, however it is not an absolutely necessary step in the fabrication of electrodes according to the present invention. It is considered to be a novel feature of electrodes of this invention that such a reduction step is not necessary to produce photoactive properties.

Following the heat treatment steps, fabrication of each electrode was completed by attaching a platinum wire to the coated foil piece. A small region of the electrode coating was removed to reveal the bare metal substrate. A platinum wire was silver epoxy welded to the electrode and the weld joint was covered with silicone rubber.

The photoelectrochemical properties of the electrode prepared in each case were evaluated by measuring the current flow through a cell employing the electrode. The cell in each case consisted of the photoactive electrode, a standard calomel reference electrode, and a platinum counter electrode of 2 cm$^2$ surface area. The electrolyte solution in each Example was either 1 normal aqueous sodium chloride solution or 1 normal aqueous sodium hydroxide solution. Various voltages were impressed across the cell as measured between the experimental electrode and the calomel reference electrode. The current flow between the photoactive electrode and the platinum counter electrode at each voltage was measured. These data appear in the following Table.

The electrical measurements were made while the photoelectrode of each Example was illuminated by light from a 150 watt Model VIX-150 lamp (Eimac Division, Varian Associates, 301 Independence Way, Palo Alto, CA 94070). The light passed through a water-filled tube with quartz endplates to remove infrared wavelengths, and then through a quartz lens to concentrate the light on the photoactive electrode. Measurement indicated that under these conditions, approximately 200 milliwatts of radiant energy of wavelengths less than 400 nanometers were striking the electrode.

EXAMPLE I

The active electrode coating material consisted of a 1:24 molar ratio mixture of tungstic oxide ($WO_3$) and titanium dioxide ($TiO_2O$), respectively. To prepare the mixture, 15.6 g (0.390 mole) of sodium hydroxide were dissolved in one liter of water. Tungstic oxide (2.32 g., 0.01 mole) was added with stirring until a clear solution was obtained. Titanium dioxide (19.2 g, 0.24 mole) was added to the aqueous tungstate solution with rapid stirring to maintain the titanium dioxide in suspension. To the rapidly stirred mixture were rapidly added 30 milliliters of concentrated hydrochloric acid, followed immediately by a second 30 milliliter portion. The coprecipitate of tungstic oxide and titanium dioxide which formed was collected after centrifuging the mixture and decanting the supernate. The residue was washed free of acid with successive rinses with demineralized water, and air dried in an over at 105° C.

It has been found that a coprecipitated mixture of molybdenum oxide and titanium dioxide serves also as an effective photoactive semiconductor electrode coating material. The mixture can be formed by coprecipitation of molybdenum oxide from aqueous alkaline molybdate solutions together with suspended titanium dioxide in a manner analogous to the method just described for tungstic oxide. The steps of forming the coprecipitated mixture and subsequently, of the finished electrode are the same as those given for the tungstic oxide-titanium dioxide system.

The method of electrode fabrication, including the steps of painting, heat treatment in air at 750° C. for eight hours, and reduction in hydrogen at 900° C. for three hours, and attachment of the platinum wire lead are those detailed above.

The currents generated by the illuminated electrodes at various values of applied potential are given in the accompanying Table.

EXAMPLE II

In this Example, the electrode coating material consisted of a 1:12 molar ratio mixture of aluminum oxide ($Al_2O_3$) and titanium dioxide ($TiO_2$). A mixture of finely divided aluminum oxide (1.02 g, 0.01 mole) and finely divided titanium dioxide (9.59 g, 0.12 mole) was thoroughly shaken. A portion of the dry mixture was taken up in aqueous acetone to form a slurry which was painted on titanium foil. This foil piece was then fabricated into an electrode and evaluated by the processes described above. The current flows generated by this electrode at various values of applied voltage under illumination appear in the accompanying Table.

EXAMPLE III

In this Example, the electrode coating material was a 1:12 molar ratio mixture of lanthanum cobaltate ($La_2O_3.Co_2O_3$) and titanium dioxide ($TiO_2$). The lanthanum cobaltate was prepared by the method detailed in U.S. Pat. No. 3,931,393 issued to Frank C. Palilla and assigned to the asignee of the present invention. A mixture of 2.46 g (0.01 mole) of finely divided lanthanum cobaltate and 9.59 g (0.12 mole) of titanium dioxide was thoroughly mixed by shaking. A portion of this dry mixture was taken up in acetone and the resulting slurry was painted on titanium foil. The coated foil piece was fabricated into an electrode and evaluated by the processes described above in Example I. The current flows generated by this electrode under illumination at various values of applied voltage appear in the accompanying Table.

EXAMPLE IV

In Example IV, the electrode coating material consisted of a 1:1:24 molar ratio mixture of aluminum oxide, tungstic oxide, and titanium dioxide, respectively. To prepare the mixture, 1.02 g (0.01 mole) of aluminum oxide were mixed by thorough shaking with 19.432 g of the 1:24 mixture of tungstic oxide and titanium dioxide prepared in Example I. This mixture was slurried in aqueous acetone and painted on titanium foil. The coated foil piece was fabricated into an electrode using the process described above. The electrode was evaluated in a cell utilizing 1 normal sodium hydroxide as the electrolyte solution. The currents generated by the electrode at various values of applied voltage appear in the accompanying Table.

EXAMPLE V

In this Example, the electrode coating material consisted of a 1:24 molar ratio mixture of tungstic oxide and titanium dioxide prepared as described above in Example I. The electrode preparation was similar to that described above in Example I with the exception that in this Example, the reduction step in hydrogen gas was omitted.

The procedure for evaluating the photoelectrochemical properties of this electrode was the same as described above. The currents generated at various values of applied voltage are given in the accompanying Table.

TABLE

| EX. | ELECTRODE COATING | OPEN CIRCUIT POTENTIAL (VOLTS) | CURRENT FLOW IN MILLIAMPERES AT THE GIVEN POTENTIAL | | | | | | | | | | | | |
|---|---|---|---|---|---|---|---|---|---|---|---|---|---|---|---|
| | | | −0.8 V | −0.6 V | −0.4 V | −0.2 V | 0.0 V | +0.2 V | +0.4 V | +0.6 V | +0.8 V | +1.0 V | +1.2 V | +1.4 V | +1.6 V | +1.8 V |
| I | 1:24 $WO_3$:$TiO_2$ (reduced) | −0.445 | | | | | 4.4 | 7.2 | 8.8 | | | | | | | |
| II | 1:12 $Al_2O_3$:$TiO_2$ (reduced) | −0.426 | | | | | 6.8 | 13.6 | 16.0 | | | | | | | |
| III | 1:12 $LaCoO_3$:$TiO_2$ (reduced) | −0.421 | | | | | 4.8 | 10.8 | 14.0 | 15.0 | | | | | | |
| IV | 1:1:24 $Al_2O_3$:$WO_3$:$TiO_2$ (reduced) | −0.908 | 2.8 | 13.6 | 16.4 | 17.4 | 17.6 | 17.8 | | | | | | | | |

TABLE-continued

| EX. | ELECTRODE COATING | OPEN CIRCUIT POTENTIAL (VOLTS) | CURRENT FLOW IN MILLIAMPERES AT THE GIVEN POTENTIAL | | | | | | | | | | | | | |
|---|---|---|---|---|---|---|---|---|---|---|---|---|---|---|---|---|
| | | | −0.8 V | −0.6 V | −0.4 V | −0.2 V | 0.0 V | +0.2 V | +0.4 V | +0.6 V | +0.8 V | +1.0 V | +1.2 V | +1.4 V | +1.6 V | +1.8 V |
| V | 1:24 $WO_3$:$TiO_2$ (unreduced) | −0.421 | | | | 1.0 | 4.0 | 7.4 | 9.4 | 10.8 | | | | | | |

The open circuit voltages shown in the accompanying Table are for the electrode and cell system described in each Example above as measured with the experimental electrode under illumination. Examination of the data in the Table shows that the current generated by the illuminated electrode increased in each case with increasing applied potential, with higher current values obtained in those Examples where the electrolyte solution was sodium hydroxide.

While there has been shown and described what is believed at present to constitute the preferred embodiments of the present invention, it will be obvious to those skilled in the art that various changes and modifications may be made therein without departing from the scope of the invention as defined by the appended claims.

What is claimed is:

1. A method of preparing polycrystalline thin film photoactive semiconductor electrodes utilizable in photoelectrochemical cells and photoassisted oxidation-reduction reactions comprising sequentially the steps of:

providing a suspension of finely divided electrode coating material in a volatile solvent selected from the group consisting of water, low molecular weight alcohols, esters, ketones, and mixtures thereof, wherein the material consists of a uniform mixture of titanium dioxide and at least one oxide of a metal selected from the group consisting of the d-electron transition metals excluding titanium, the metal exhibiting an oxidation state other than +4 in the oxide, applying the suspension of electrode coating material to the surface of a conductive body to form a thin film of the electrode coating material thereon, and heating the coated conductive body at an elevated temperature for a period of time sufficient to sinter the electrode coating to the body.

2. The method of claim 1 wherein said electrode coating material consists of a uniform coprecipitated mixture of titanium dioxide and said metal oxide.

3. The method of claim 1 wherein said electrode coating material consists essentially of a uniform mixture of titanium dioxide and up to 50 mole percent of at least one oxide selected from the group consisting of, cobalt oxide, lanthanum oxide, molybdenum oxide, tungstic oxide, and mixtures thereof.

4. The method of claim 1 wherein said coated conductive body is heated in an oxygen-containing atmosphere at a temperature of from about 500° C. to about 800° C. for a period of from one-quarter hour to eight hours.

5. The method of claim 4 wherein said oxygen-containing atmosphere is air.

* * * * *